UNITED STATES PATENT OFFICE.

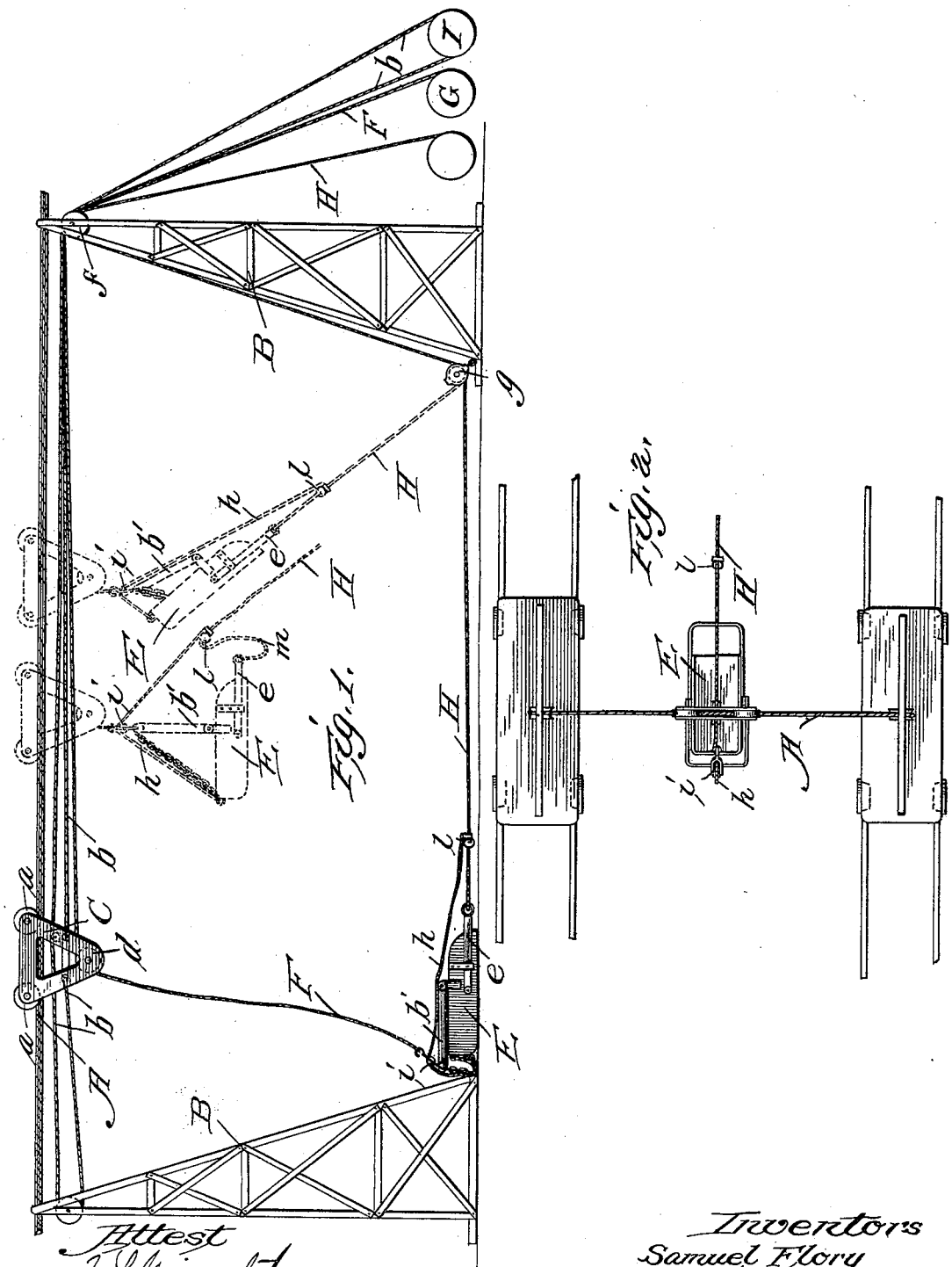

SAMUEL FLORY AND ANDREW A. BRUCH, OF BANGOR, PENNSYLVANIA.

EXCAVATING APPARATUS.

SPECIFICATION forming part of Letters Patent No. 622,422, dated April 4, 1899.

Application filed December 16, 1898. Serial No. 699,478. (No model.)

*To all whom it may concern:*

Be it known that we, SAMUEL FLORY and ANDREW A. BRUCH, citizens of the United States, residing at Bangor, Pennsylvania, have invented certain new and useful Improvements in Excavating Apparatus, of which the following is a specification.

Our invention relates to excavating apparatus of that class in which carriers travel upon a cable or aerial way, being moved back and forth by an endless rope or cord and carrying a receptacle which is lowered or raised in order to receive the material to be excavated.

It is the object of the present invention to use as this receptacle a scoop and to manipulate this scoop from the source of power to fill it by scraping and to have such a construction and connections as to enable the operator to not only fill the scoop from a distance, but to dump it at any point in its elevation.

In the accompanying drawings, Figure 1 shows a way with three carriers, the operating-drums being shown in diagram at one end and the receptacle being shown in different positions. Fig. 2 is a diagram showing the cableway stretched across a canal or the like where the excavation is being made with the scoop adapted to operate at right angles to the way.

In Fig. 1 the aerial way is shown at A and is preferably a stout cable supported upon towers B, with the ends suitably anchored in the ordinary way. Wheeled carriers run on this way, an ordinary form of the carrier being shown as made up of a triangular frame C, having supporting-wheels $a$. The carriers are moved back and forth from the power-room through an endless rope or cord connected to the carrier and extending around a driving-drum, this endless cord and its drum being indicated at $b$. It will be understood that this places the carrier completely under the control of the operator, and he can make it go in one direction or the other as circumstances may require.

The receptacle for excavating and lifting the earth or other material is shown at E and is preferably in the form of a scoop. It is provided with a bail $b'$, pivoted to the body, and a chain connects this bail with the rear of the scoop, so as to limit the forward movement of the bail. The scoop is supported by a hoisting-rope F, passing over a pulley $d$ on the carrier and extending to the drum G. A scraping-rope is shown at H, and this connects with a horizontal bail $e$ and extends to a drum I. This rope passes from the drum I over the supporting-pulley $f$ and then preferably down to near the base of the tower under a pulley $g$, and from thence it extends to the bail $e$, and when power is applied it draws the scoop along to fill the same. After the scoop is filled the scraping-rope may be slackened and the hoisting-rope F made taut to elevate the scoop, as shown at the central part of Fig. 1. The carrier is held stationary while the scoop is being hoisted, and after this is effected the carrier may then be moved backward or forward to the position of the dump. The scoop is dumped by the rope H. To effect this, a cord or rope $h$ extends from the rear of the scoop over the small pulley $i$ and downwardly, having upon its end an eye, through which is threaded the rope H, this rope being provided with a stop $l$ to limit its movement and forming a loop or slack part $m$, as shown in the central part of Fig. 1. When it is desired to dump the scoop, the carrier is held stationary on the way $n$, and the hoisting-rope is also kept taut while the rope H is drawn upon, as shown in the right of Fig. 1, with the result that through the rope $h$ the rear of the scoop is lifted, swinging on the pivot of the bail, and the contents dumped. The dumping may take place at any position of the scoop between its lowest and highest position.

In Fig. 2 we have shown in diagram the tower B arranged on each side of an excavation, with the scoop adapted to operate at right angles to the line of the cable instead of with the line of the cable, as in Fig. 1, and this result is obviously secured by conveniently arranging the pulleys for the scraping or dumping rope H as shown.

What we claim is—

1. In combination with a way, a carrier thereon, with means for moving the same, a receptacle with means for raising and lowering the same in relation to the carrier and a combined scraping and dumping rope connected with the receptacle, substantially as described.

2. In combination with a way, a carrier, a scoop having a pivoted bail and a scraping and dumping rope connected directly with said scoop, substantially as described.

3. In combination with a way, a carrier, a scoop having a pivoted bail, a cord or rope connecting with the rear of said scoop and extending upward over the bail and downwardly to the front and a rope H connected with the scoop and engaging the front end of the rope for dumping the scoop, substantially as described.

4. In combination with a way, a carrier with means for controlling the movement of said carrier in either direction and for holding the same stationary on the way, a scoop with means for raising and lowering the same in relation to the carrier and a rope H adapted to move the scoop to fill the same and to dump the scoop after filling, substantially as described.

5. In combination with a way, a carrier thereon with means for moving the same, a receptacle with means for raising and lowering the same in relation to the carrier and an independent dumping-rope connected with the receptacle at front and rear and extending over the bail thereof.

In testimony whereof we affix our signatures in presence of two witnesses.

SAMUEL FLORY.
ANDREW A. BRUCH.

Witnesses:
THOS. J. KICHLINE,
CHARLES K. STIER.